United States Patent
Au et al.

(10) Patent No.: US 7,667,355 B2
(45) Date of Patent: Feb. 23, 2010

(54) APPARATUS FOR GENERATING AMPLIFIED COOLING AIR FLOWS

(75) Inventors: Yuk Cheung Au, Kwai Chung (HK);
Kin Yik Hung, Kwai Chung (HK);
Wing Chiu Derek Lai, Kwai Chung (HK); Pak Kin Leung, Kwai Chung (HK); Cheuk Wah Chester Tang, Kwai Chung (HK); Wai Lam, Kwai Chung (HK)

(73) Assignee: ASM Assembly Automation Ltd., Hong Kong (HK)

( * ) Notice: Subject to any disclaimer, the term of this patent is extended or adjusted under 35 U.S.C. 154(b) by 240 days.

(21) Appl. No.: 11/969,575

(22) Filed: Jan. 4, 2008

(65) Prior Publication Data

US 2009/0195088 A1    Aug. 6, 2009

(51) Int. Cl.
*H02K 41/00*    (2006.01)
(52) U.S. Cl. .................... 310/12.29; 310/12.01
(58) Field of Classification Search .......... 310/12.01, 310/12.29, 52–59
See application file for complete search history.

(56) References Cited

U.S. PATENT DOCUMENTS

| 5,834,862 | A | | 11/1998 | Hartzell | |
| 6,114,781 | A | * | 9/2000 | Hazelton et al. | 310/12.29 |
| 6,469,406 | B1 | * | 10/2002 | Hwang et al. | 310/12.29 |
| 6,731,026 | B1 | * | 5/2004 | Kawaguchi et al. | 310/12.29 |
| 6,992,410 | B2 | * | 1/2006 | Chen et al. | 310/52 |
| 7,205,687 | B2 | * | 4/2007 | Wavre et al. | 310/58 |
| 7,359,032 | B2 | * | 4/2008 | Dansberg et al. | 355/53 |
| 7,514,825 | B2 | * | 4/2009 | Lai et al. | 310/12.29 |
| 2009/0072634 | A1 | * | 3/2009 | Vollmer | 310/12 |

* cited by examiner

*Primary Examiner*—Thanh Lam
(74) *Attorney, Agent, or Firm*—Ostrolenk Faber LLP

(57) ABSTRACT

A linear motor comprising a coil assembly and a magnet assembly is provided with a cooling apparatus which comprises a segmented air knife assembly. The segmented air knife assembly has a plurality of slot openings distributed along its length which is coupled to the linear motor and it is operative to discharge cooling air into a gap between the coil assembly and magnet assembly in a discharge direction. An inclined surface extends from the plurality of slot openings and slopes at an obtuse angle away from the discharge direction of the cooling air. Each slot opening is individually configured to discharge the cooling air in the discharge direction at a sufficient velocity so as to entrain atmospheric air along the inclined surface to amplify the cooling air that is so discharged.

11 Claims, 3 Drawing Sheets

APPARATUS FOR GENERATING AMPLIFIED COOLING AIR FLOWS

FIELD OF THE INVENTION

The invention relates to an apparatus for cooling linear motors that are typically used as actuators for positioning mechanisms, and in particular, to an apparatus for generating cooling air to cool the current-carrying coils comprised in such linear motors.

BACKGROUND AND PRIOR ART

Linear motors are commonly used in semiconductor assembly equipment as a fast and accurate means to drive mechanical parts as they can provide relatively higher system performance as compared to rotary servo motors that are coupled with rotary to linear conversion mechanisms. This is due to the elimination of added inertia, friction, compliance and backlash that typical rotary-to-linear mechanisms have. High force density, excellent response and high reliability are some advantages of brushless linear motors.

A linear motor comprises permanent magnets that are arranged to form a magnetic field and a coil assembly that is disposed within the magnetic field which is configured for carrying a current. Either the set of permanent magnets or the coil assembly is typically kept stationary while the other component is configured to be movable relative to it in order to drive a payload.

A main source of heat generation in a linear motor occurs in its force-producing coil assembly, and this often places a heat generator in close proximity to the payload. Furthermore, in conventional linear motors, the gaps allowed between the coil assembly and the permanent magnets are usually very small to maximize efficiency, resulting in inefficient heat dissipation between the respective surfaces of the coil assembly and the permanent magnets to the environment. In high accuracy applications, this will be a concern since dimensional stability is affected by changing ambient thermal conditions. In addition to the moving payload, the system's own components such as guides or feedback may react negatively to elevated temperatures and lead to safety issues or even failure of the linear motor.

It is thus necessary to implement an apparatus to prevent such adverse effects. Providing a thermal insulator between the coil assembly and the rest of the system may be one approach, but this might significantly de-rate the motor due to effective loss of its heat sink. Therefore, many linear motors are often offered with internal air cooling.

One type of air cooling apparatus that has been implemented in the prior art to cool linear motors is described in U.S. Pat. No. 5,834,862 entitled "Linear Motor Cooling System". A cooling system is described therein for a closely coupled linear motor including a moving coil mounted for movement on a stator core. A nozzle comprising a base member and a cover plate is mounted on one end of the moving coil for producing a pair of high velocity sheets of air which are directed horizontally over the surface of the exposed turns so as to rapidly cool and stabilize the temperature of the coils.

However, these high velocity sheets of air are generated in directions that are perpendicular to the gaps between the coil frame and the magnet assembly, and not directly into the gaps. The sheets of air are instead made to traverse curvatures in the coil frame before entering the gaps. This approach of initially generating the air-flow perpendicular to the gaps is likely to result in the loss of cooling air into the atmosphere while the cooling air traverses the curvature of the frame. This is especially so when the radius of curvature of the frame is small, and would in turn reduce the amount of cooling air that is available to enter the gaps and pass over the heated coils. The cooling effect would thus be less efficient. It would be advantageous to generate cooling air directly into the gaps between the coils and the permanent magnets, while at the same time amplify the cooling air flow.

It would be appreciated that conventional cooling apparatus such as the aforesaid utilize a large volume of compressed air to generate a cooling air flow. It is desirable to reduce the volume of compressed air required for cooling purposes. Furthermore, the cooling air flow so generated may leak into the surroundings and inadvertently contaminate a clean production environment. More efficient use of cooling air and maintaining a cleaner production environment may be achieved by taking measures to control and to limit the air flow as far as possible only across surfaces that need to be cooled and not into the production area.

SUMMARY OF THE INVENTION

It is thus an object of the invention to seek to provide a cooling apparatus for linear motors that utilizes a reduced volume of cooling air that has to be generated while being capable of amplifying the cooling air flow generated.

It is a further object of the invention to amplify the cooling air flow by entraining atmospheric air together with the generated cooling air flow.

It is yet a further object of the invention to provide a cooling apparatus which reduces the risk of contamination of a clean production environment.

Accordingly, the invention provides a cooling apparatus for a linear motor comprising a coil assembly and a magnet assembly, the cooling apparatus comprising: a segmented air knife assembly comprising a plurality of slot openings distributed along its length which is coupled to the linear motor, the air knife assembly being operative to discharge cooling air into a gap between the coil assembly and magnet assembly in a discharge direction; and an inclined surface extending from the plurality of slot openings and sloping at an obtuse angle away from the discharge direction of the cooling air; wherein each slot opening is individually configured to discharge the cooling air in the discharge direction at a sufficient velocity so as to entrain atmospheric air along the inclined surface to amplify the cooling air that is so discharged.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

The present invention will be readily appreciated by reference to the detailed description of one preferred embodiment of the invention when considered with the accompanying drawings, in which.

DETAILED DESCRIPTION OF THE PREFERRED EMBODIMENT OF THE INVENTION

The preferred embodiment of the present invention will be described hereinafter with reference to the accompanying drawings.

Figure 1:
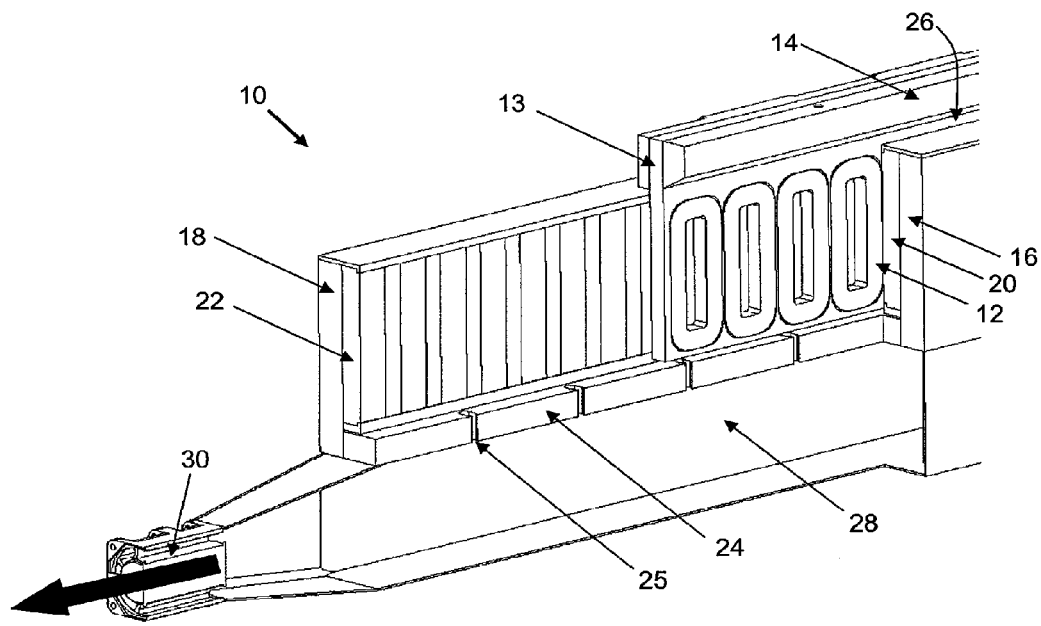
FIG. 1 is an isometric view of a linear motor which incorporates a cooling apparatus according to the preferred embodiment of the invention wherein a magnet assembly is partially removed to expose a coil assembly of the linear motor.

FIG. 1 is an isometric view of a linear motor 10 which incorporates a cooling apparatus according to the preferred embodiment of the invention wherein a magnet assembly 20 is partially removed to expose a coil assembly of the linear motor 10. The coil assembly comprises a coil bracket 13 containing multiple coils 12. The cooling apparatus is preferably in the form of a segmented air knife assembly 14 mounted onto the linear motor 10.

Permanent magnets are incorporated within first and second magnet assemblies 20, 22 which are mounted onto first and second magnet holders 16, 18 respectively. The first and second magnet assemblies 20, 22 are further fixed onto a side wall of the linear motor, such as a magnet mount 24, which extends substantially parallel to a driving direction of the linear motor 10. Opposite poles of the permanent magnets are arranged facing each other so as to form a substantially uniform magnetic field between the first and second magnet assemblies 20, 22. The coil bracket 13 is disposed in a gap 26 between the magnet assemblies 20, 22 and is configured to be driven substantially along a plane that is parallel to the opposing surfaces of the magnet assemblies 20, 22, and the coil bracket 13 is further driven in directions which are parallel to the length of the magnet mount 24.

There is also a plurality of air outlets 25 located along a length of the magnet mount 24, which are preferably spaced substantially equidistant from one another along the magnet mount 24. The air outlets 25 and the air knife assembly 14 are preferably located on opposite sides of the linear motor 10, such that in the illustrated embodiment, they are located at the bottom and at the top of the linear motor 10 respectively. The air outlets 25 lead to an air suction chamber 28 directly adjacent to the magnet mount 24 and positioned below the linear motor 10. The air suction chamber 28 is connected to a suction device, such as a suction fan 30, for drawing air from the linear motor 10 into the air suction chamber 28 through the air outlets 25. In the illustrated embodiment, the air suction chamber 28 forms part of an exhaust system which tapers at one end towards the suction fan 30.

The air knife assembly 14 is more preferably mounted onto the coil assembly, and in particular, onto the coil bracket 13. The coil assembly is configured to be movable relative to the first and second magnet assemblies 20, 22. Thus, the segmented air knife assembly 14 that is mounted onto the coil assembly is movable therewith. This embodiment is especially useful in linear motor designs for which the length of the magnet assembly is significantly greater than the length of the coil bracket 13, such as where a greater range of motion of the coil bracket 13 is required. In this case, it is more efficient to locate the cooling apparatus on the movable coil bracket 13 instead of fixing it onto the magnet assemblies 20, 22 so that the air knife assembly 14 is movable with the coil bracket 13 to constantly generate cooling air flow directly onto it. Nevertheless, it should be appreciated that the air knife assembly 14 could also be mounted onto one or both of the magnet assemblies 20, 22.

In FIG. 1, the air knife assembly 14 is only mounted adjacent to one surface of the coil bracket 13, so that the air knife assembly 14 generates cooling air onto only one surface of the coil assembly. If required, the air knife assembly 14 may be mounted adjacent to both surfaces of the coil assembly to inject cooling air onto both surfaces of the coil assembly. The discharge direction of the cooling air by the air knife assembly 14 is substantially perpendicular to the driving directions of the linear motor 10.

Figure 2:
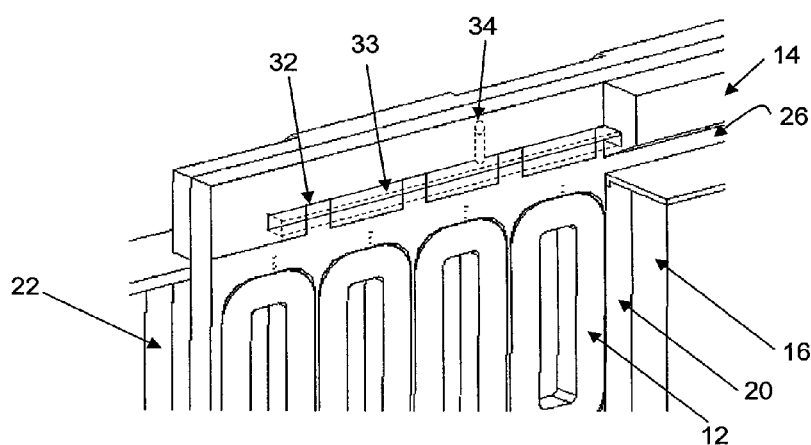
FIG. 2 is an enlarged isometric view of the cooling apparatus of FIG. 1, wherein a portion of a segmented air knife assembly is removed to partially expose an air channel of the air knife assembly.

FIG. 2 is an enlarged isometric view of the cooling apparatus of FIG. 1, wherein a portion of the segmented air knife assembly 14 is removed to partially expose an air channel 33 of the air knife assembly 14. The air knife assembly 14 discharges cooling air into the gap 26 between the coil assembly and the magnet assembly 20 in a discharge direction through a plurality of slot openings 32. The slot openings are distributed along the length of the air knife assembly 14. The air channel 33 as denoted by the dotted lines in FIG. 2 connects an air inlet 34 to the plurality of slot openings 32 such that the cooling air introduced from the air inlet 34 is distributed to the slot openings 32. Prior to entering the air knife assembly 14, the compressed air may first be cooled to below room temperature by a thermoelectric cooler. The cooled compressed air permits more heat to be removed from the coils 12 as it flows through the gap 26. An air stream traveling at a high volume flow rate is generated and injected into the gap 26. Segmentation of the air knife assembly 14 enhances the volume flow rate of the cooling air flow, thereby allowing an increased flow of entrained air into the gap 26 as explained below with reference to FIG. 6.

Figure 3:
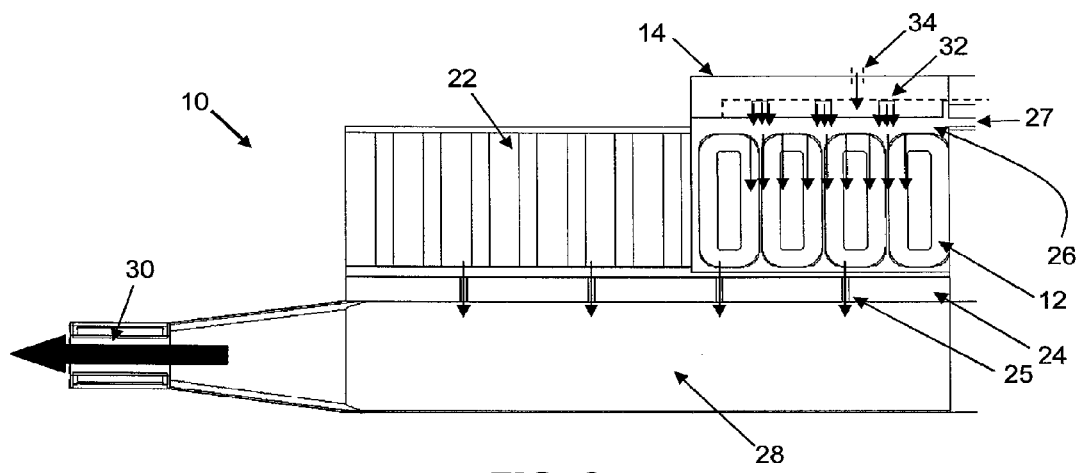
FIG. 3 is a front view of the linear motor of FIG. 1 which illustrates cooling air flow paths across the linear motor.

FIG. 3 is a front view of the linear motor 10 of FIG. 1 which illustrates cooling air flow paths across the linear motor 10. The cooling air flow enters the segmented air knife assembly 14 at the air inlet 34 and is ejected through the slot openings 32 directly into the gap 26 between the coil assembly 12 and the magnet assembly 20 before being exhausted through the air outlets 25 formed in the magnet mount 24 into the air suction chamber 28 of the exhaust system. The cooling air flow is amplified by air entrained into the gap 26 via an atmospheric air inlet 27 immediately next to the gap 26. The amplification of the said cooling air flow is explained at FIG. 6. Further, the exhaust system provides an active exhaust mechanism by directing the cooling air flow to the bottom of the linear motor 10 as described above before channeling the air flow through the air outlets 25 into the exhaust system. This prevents the air from uncontrollably escaping through the sides of the linear motor 10, which may contribute to the contamination of the production environment.

Figure 4:
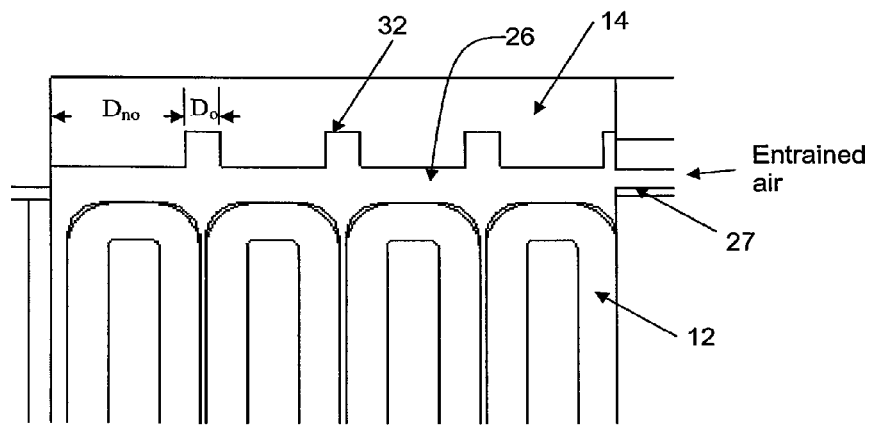
FIG. 4 is an enlarged front view of an upper portion of the linear motor which illustrates slot openings comprised in the segmented air knife assembly.

FIG. 4 is an enlarged front view of an upper portion of the linear motor 10 which illustrates slot openings 32 comprised in the segmented air knife assembly 14. The segmentation increases the speed of the cooling air flowing out of the segmented air knife assembly 14, and this results in more air being entrained into the gap 26, which in turn amplifies the volume flow rate of the cooling air. The parameters regulating this amplification effect on the volume flow rate are controllable by the slot ratio of $D_{no}:D_o$, wherein $D_{no}$ denotes the length between two adjacent slot openings 32 and $D_o$ denotes the width of the slot openings 32. Changing the slot ratio of $D_{no}:D_o$ has surprisingly been found to vary the cooling effect by varying the flow capacity of the compressed air stream generated by the air knife assembly 14. A slot ratio of a length between adjacent slot openings 32 and a width of each slot opening 32 is substantially 3:1 which provides an optimized cooling effect of air flow. The cooling effect is comparatively lower for a slot ratio of substantially less than 3:1. The higher slot ratio further ensures that less compressed air needs to be generated for a desired cooling air flow rate.

Figure 5:
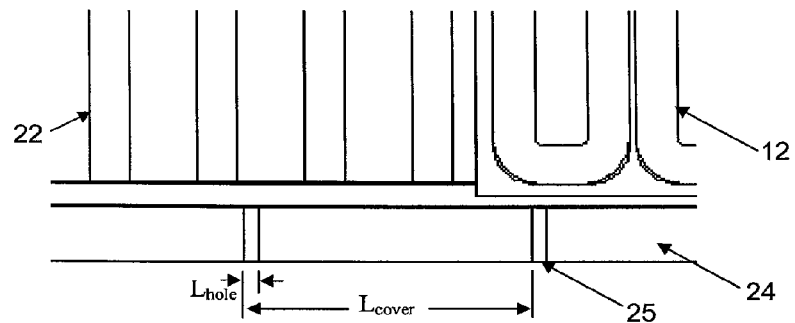
FIG. 5 is an enlarged front view of a lower portion of the linear motor which illustrates air outlets formed in a magnet mount for exhausting cooling air from the linear motor.

FIG. 5 is an enlarged front view of a lower portion of the linear motor 10 which illustrates air outlets 25 formed in the magnet mount 24 for exhausting cooling air from the linear motor 10. $L_{hole}$ denotes the diameter of each air outlet 25 and $L_{cover}$ denotes the pitch between two adjacent air outlets 25. The slot ratio of $L_{hole}$:$L_{cover}$ affects the total suction flow and the evenness of the suction flow into the air suction chamber 28. The slot ratio of a diameter of each air outlet 25 and a pitch between two adjacent outlets is preferably within the range of 0.05:1 to 0.5:1.

Figure 6:
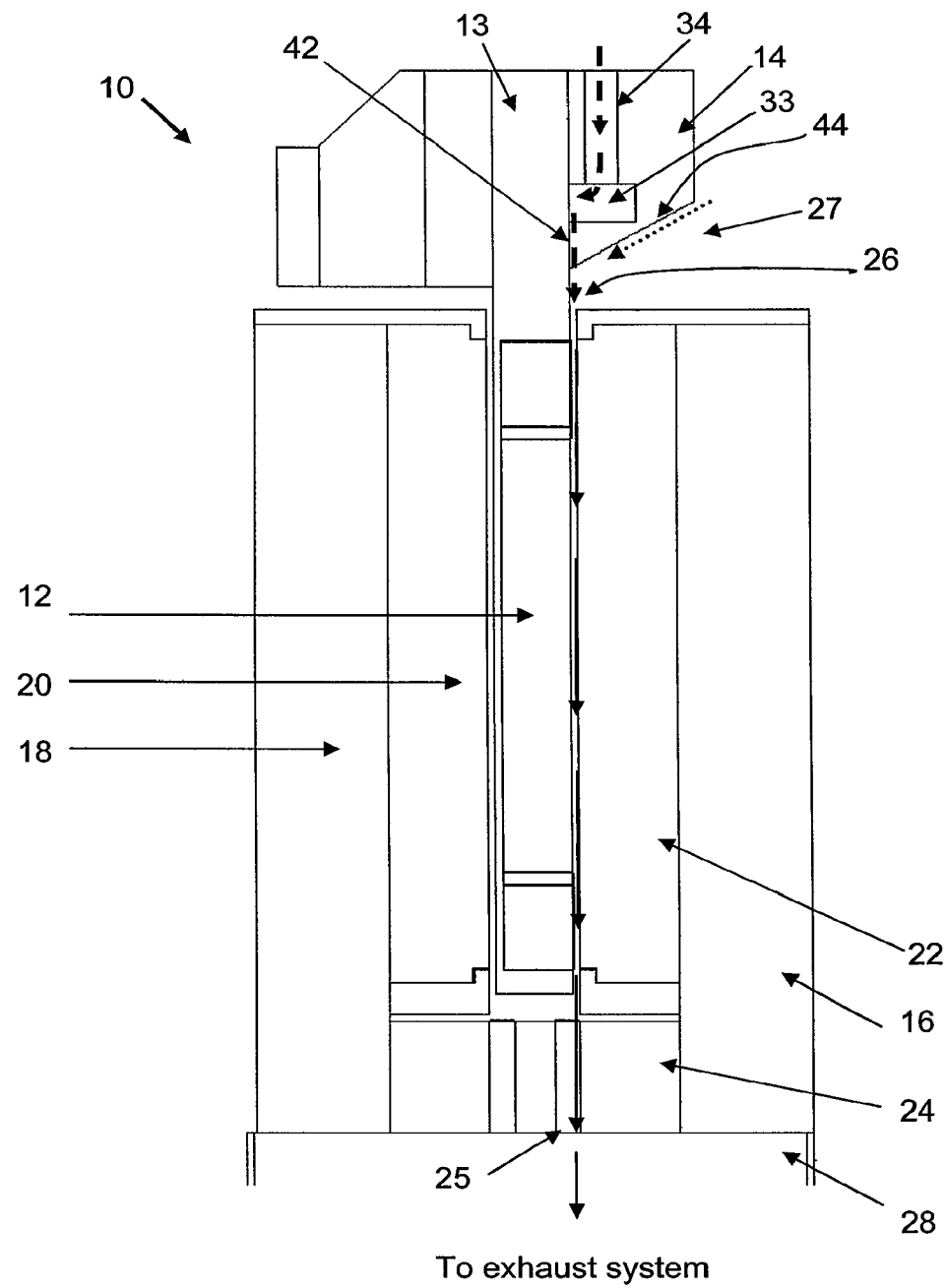
FIG. 6 is a cross-sectional side view of the linear motor which illustrates the amplification of a cooling air flow onto a surface of the coil assembly of the linear motor.

FIG. 6 is a cross-sectional side view of the linear motor 10 which illustrates the amplification of a cooling air flow onto a surface of the coil assembly of the linear motor 10. Cooling compressed air enters the segmented air knife assembly 14 through the compressed air inlet 34. The cooling air flow enters the air channel 33 of the air knife assembly 14, and is distributed along a length of the air knife assembly 14. The cooling air is then transmitted into the gap 26 through narrow air inlets 42 comprised in the slot openings 32. Compressed air that is discharged is injected into the gap 26.

Further, there is an inclined surface 44 extending from the plurality of slot openings 32 and sloping at an obtuse angle away from the discharge direction of the cooling air at the atmospheric air inlet 27. Each slot opening is individually configured to discharge the cooling air in the discharge direction at a sufficient velocity so as to entrain atmospheric air along the inclined surface to amplify the cooling air that is so discharged. The atmospheric air inlet 27 serves as a conduit for atmospheric air to be entrained into the gap 26. With the injection of compressed cooling air into the gap 26 at a sufficient velocity, air from the atmosphere will be further drawn into the gap 26 by entrainment.

The entrained air enhances and amplifies the cooling air flow generated from the air knife assembly 14. The amplified air flow enters into the gap 26 between the coil bracket 13 and the magnet assembly 20 and cools the coils 12 before being directed through the air outlets 25 at the base of the linear motor 10 into the air suction chamber 28 by air suction generated by the suction fan 30.

It should be appreciated that the cooling apparatus according to the preferred embodiment of the invention provides various advantages for cooling linear motors 10. The segmented air knife assembly 14 increases the rate of flow of compressed air generated from the air knife assembly 14 resulting in an enhanced amplification effect that draws in a larger amount of entrained air into the linear motor 10. At the same time, the segmentation of the air knife assembly such that the cooling air is passed through narrow slot openings 32 reduces the amount of compressed air required by the cooling apparatus. Thus, the cooling apparatus is able to inject a larger air flow at a higher volume flow rate into the gap between the coil and magnet assemblies for cooling the linear motor 10 while utilizing a reduced volume of compressed air.

Additionally, by first cooling the compressed air using a thermoelectric cooler to a lower temperature before supplying it into the air knife assembly, the cooling effect of the resulting air flow may be enhanced. The consumption of compressed air may therefore be reduced in view of the combination of features as described above. Furthermore, the active exhaust mechanism which directs the amplified air flow across the linear motor 10 to an air suction chamber 28 at the base thereof significantly helps to maintain a contamination-free production environment by avoiding uncontrolled air flows into the production environment.

The invention described herein is susceptible to variations, modifications and/or addition other than those specifically described and it is to be understood that the invention includes all such variations, modifications and/or additions which fall within the spirit and scope of the above description.

The invention claimed is:

1. A cooling apparatus for a linear motor comprising a coil assembly and a magnet assembly, the cooling apparatus comprising:
   a segmented air knife assembly comprising a plurality of slot openings distributed along its length which is coupled to the linear motor, the air knife assembly being operative to discharge cooling air into a gap between the coil assembly and magnet assembly in a discharge direction; and
   an inclined surface extending from the plurality of slot openings and sloping at an obtuse angle away from the discharge direction of the cooling air;
   wherein each slot opening is individually configured to discharge the cooling air in the discharge direction at a sufficient velocity so as to entrain atmospheric air along the inclined surface to amplify the cooling air that is so discharged.

2. The cooling apparatus as claimed in claim 1, wherein the coil assembly is configured to be movable relative to the magnet assembly, and the segmented air knife assembly is mounted onto the coil assembly so as to be movable therewith.

3. The cooling apparatus as claimed in claim 1, further comprising a plurality of air outlets located on a side wall of the linear motor which extends substantially parallel to a driving direction of the linear motor, wherein the air outlets are spaced along a length of the said side wall.

4. The cooling apparatus as claimed in claim 3, wherein the air outlets are spaced substantially equidistant from one another.

5. The cooling apparatus as claimed in claim 3, wherein a ratio of a diameter of each air outlet and a pitch between two adjacent outlets is within a range of 0.05:1 to 0.5:1.

6. The cooling apparatus as claimed in claim 3, further comprising an air suction chamber adjacent to said side wall of the linear motor, which is connected to a suction device for drawing air from the linear motor into the air suction chamber through the air outlets.

7. The cooling apparatus as claimed in claim 3, wherein the said air outlets and the air knife assembly are located on opposite sides of the linear motor.

8. The cooling apparatus as claimed in claim 1, further comprising a single air channel connecting an air inlet to the plurality of slot openings such that the cooling air introduced from the air inlet is distributed to the slot openings.

9. The cooling apparatus as claimed in claim 1, wherein a ratio of a length between adjacent slot openings and a width of each slot opening is substantially 3:1.

10. The cooling apparatus as claimed in claim 1, wherein the discharge direction of the cooling air is substantially perpendicular to a driving direction of the linear motor.

11. The cooling apparatus as claimed in claim 1, wherein the air knife assembly is configured to generate cooling air onto only one surface of the coil assembly.

* * * * *